United States Patent
Lee et al.

(10) Patent No.: US 12,350,628 B2
(45) Date of Patent: Jul. 8, 2025

(54) METHOD FOR QUANTIFYING AMINE COMPOUND CONSTITUTING SEPARATOR ACTIVE LAYER PRIOR TO PREPARATION OF SEPARATOR ACTIVE LAYER, METHOD FOR QUANTIFYING POLYAMIDE OR UNREACTED AMINE COMPOUND IN SEPARATOR ACTIVE LAYER, AND METHOD FOR SETTING PREPARATION CONDITIONS OF SEPARATOR ACTIVE LAYER OR ESTABLISHMENT STANDARDS FOR PREPARATION CONDITIONS OF SEPARATOR ACTIVE LAYER

(71) Applicant: LG CHEM, LTD., Seoul (KR)

(72) Inventors: Bo Ri Lee, Daejeon (KR); Kyeonghee Jang, Daejeon (KR); Keun Won Song, Daejeon (KR)

(73) Assignee: LG Chem, Ltd., Seoul (KR)

( * ) Notice: Subject to any disclaimer, the term of this patent is extended or adjusted under 35 U.S.C. 154(b) by 398 days.

(21) Appl. No.: 16/958,978

(22) PCT Filed: Apr. 19, 2019

(86) PCT No.: PCT/KR2019/004758
§ 371 (c)(1),
(2) Date: Jun. 29, 2020

(87) PCT Pub. No.: WO2019/245151
PCT Pub. Date: Dec. 26, 2019

(65) Prior Publication Data
US 2020/0338504 A1    Oct. 29, 2020

(30) Foreign Application Priority Data

Jun. 21, 2018  (KR) .................. 10-2018-0071459

(51) Int. Cl.
*B01D 65/10* (2006.01)
*B01D 69/10* (2006.01)
(Continued)

(52) U.S. Cl.
CPC ......... *B01D 65/10* (2013.01); *B01D 69/1071* (2022.08); *B01D 69/1251* (2022.08);
(Continued)

(58) Field of Classification Search
CPC ...... B01D 65/10; B01D 65/125; B01D 69/10; B01D 71/56; B01D 61/025;
(Continued)

(56) References Cited

U.S. PATENT DOCUMENTS 7,608,339 B2   10/2009  Yamazaki et al.
9,597,641 B2    3/2017  Kwon et al.
(Continued)

FOREIGN PATENT DOCUMENTS

CN   101027116   8/2007
CN   104781001   7/2015
(Continued)

OTHER PUBLICATIONS

Madrid, et al "Amine functionalized radiation-induced grafted water-hyacinth fibers for Pb2+, Cu2+ and Cr3+ uptake", Radiation Physics and Chemistry 97 (2014), pp. 246-252. (Year: 2014).*
(Continued)

*Primary Examiner* — Katherine A Bareford
(74) *Attorney, Agent, or Firm* — Bryan Cave Leighton Paisner LLP (57) ABSTRACT

Provided are a method for quantifying an amine compound forming a membrane active layer before preparing the membrane active layer, a method for quantifying a polyamide or an unreacted amine compound in a membrane active layer, and a method for determining criteria for a (Continued)

manufacturing condition of a membrane active layer or a method for setting a manufacturing condition.

4 Claims, 4 Drawing Sheets

(51) Int. Cl.
    *B01D 69/12*     (2006.01)
    *B01D 71/56*     (2006.01)
    *G01N 1/28*     (2006.01)
    *G01N 23/20091*     (2018.01)

(52) U.S. Cl.
    CPC ........... *B01D 71/56* (2013.01); *G01N 1/2813* (2013.01); *G01N 23/20091* (2013.01); *B01D 2325/04* (2013.01); *G01N 2223/633* (2013.01)

(58) Field of Classification Search
    CPC ........... B01D 2323/05; B01D 2325/04; B01D 2323/50; B01D 69/125; B01D 69/1071; B01D 69/1251; G01N 1/2813; G01N 23/20091; G01N 2223/633
    See application file for complete search history.

(56) References Cited

U.S. PATENT DOCUMENTS

| | | | |
|---|---|---|---|
| 2007/0134476 A1* | 6/2007 | Yamazaki | B32B 27/18 428/500 |
| 2008/0027657 A1 | 1/2008 | Rohde et al. | |
| 2008/0257818 A1* | 10/2008 | Konishi | B01D 71/56 427/244 |
| 2010/0003770 A1 | 1/2010 | Shibata et al. | |
| 2010/0054982 A1* | 3/2010 | Larsson | B22F 1/142 419/36 |
| 2010/0197488 A1* | 8/2010 | Hagemeyer | B01J 35/008 502/262 |
| 2011/0201210 A1 | 8/2011 | Sato et al. | |
| 2013/0015351 A1* | 1/2013 | Kooijman | H01J 37/28 250/307 |
| 2014/0158612 A1 | 6/2014 | Kong et al. | |
| 2014/0251131 A1* | 9/2014 | Way | C01B 3/38 95/56 |
| 2014/0311969 A1 | 10/2014 | Ko et al. | |
| 2015/0157989 A1 | 6/2015 | Kwon et al. | |
| 2015/0352501 A1 | 12/2015 | Ko et al. | |
| 2015/0371368 A1* | 12/2015 | Kitagawa | G06T 3/4053 348/79 |
| 2017/0296985 A1 | 10/2017 | Nakao et al. | |

FOREIGN PATENT DOCUMENTS

| | | |
|---|---|---|
| EP | 1820566 A1 | 8/2007 |
| JP | S61-137041 | 6/1986 |
| JP | H10-132802 | 5/1998 |
| JP | 2000-046768 | 2/2000 |
| JP | 2005-127938 | 5/2005 |
| JP | 2005-137964 | 6/2005 |
| JP | 2006-122886 | 5/2006 |
| JP | 2006-300957 | 11/2006 |
| JP | 2009-544980 | 12/2009 |
| JP | 2010-016042 | 1/2010 |
| JP | 2014-064989 | 4/2014 |
| JP | 2014-146828 | 8/2014 |
| JP | 2014-194355 | 10/2014 |
| JP | 2015-511175 | 4/2015 |
| JP | 2016-218022 | 12/2016 |
| KR | 10-2006-0092252 | 8/2006 |
| KR | 10-2009-0007499 | 1/2009 |
| KR | 10-2011-0072156 | 6/2011 |
| KR | 10-2015-0066362 | 6/2015 |

OTHER PUBLICATIONS

Ciolkowski, et al "A Forensic Microscopy Approach for Identifying Subvisible Particulates in a Sterile Ophthalmic Solution", Pharmaceutical Technology Jun. 2017, pp. 28-35. (Year: 2017).*
Yang, et al "Nitrogen-Rich and Fire-Resistant Carbon Aerogels for the Removal of Oil Contaminants from Water", ACS Applied Materials & Interfaces 2014, 6, pp. 6351-6360. (Year: 2014).*
Lai, et al "Passivation of Sponge Iron and GAC in Fe0/GAC Mixed-Potential Corrosion Reactor", Ind. Eng. Chem. Res. 2012, 51, pp. 7777-7785. (Year: 2012).*
Raaijmakers, M., "Hyper-cross-linked, hybrid membranes via interfacial polymerization," Enschede, Universiteit Twente, 2015, 292 pages, doi: 10.3990/1.9789036539678.
Gorzalski et al., "Elemental composition of membrane foulant layers using EDS, XPS, and RBS," J. Membrane Sci., 522(15): 31-44 (2017).
Zou et al., "Synthesis and characterization of thin film composite reverse osmosis membranes via novel interfacial polymerization approach," Separation and Purification Technology 72: 256-262 (2010).
Song et al., "Mechanisms of structure and performance controlled thin film composite membrane formation via interfacial polymerization process," Journal of Membrane Science 251: 67-79 (2005).
Wang et al., "Preparation and performance of polyamide/ZIF-8 double composite nanofiltration membrane," Applied Chemical Industry 3: 397-401 (2016), Abstract only.

* cited by examiner

METHOD FOR QUANTIFYING AMINE COMPOUND CONSTITUTING SEPARATOR ACTIVE LAYER PRIOR TO PREPARATION OF SEPARATOR ACTIVE LAYER, METHOD FOR QUANTIFYING POLYAMIDE OR UNREACTED AMINE COMPOUND IN SEPARATOR ACTIVE LAYER, AND METHOD FOR SETTING PREPARATION CONDITIONS OF SEPARATOR ACTIVE LAYER OR ESTABLISHMENT STANDARDS FOR PREPARATION CONDITIONS OF SEPARATOR ACTIVE LAYER

CROSS-REFERENCE TO RELATED APPLICATION(S)

This application is a National Stage Application of International Application No. PCT/KR2019/004758 filed on Apr. 19, 2019, which claims priority to and the benefits of Korean Patent Application No. 10-2018-0071459, filed with the Korean Intellectual Property Office on Jun. 21, 2018, the entire contents of which are incorporated herein by reference.

TECHNICAL FIELD

The present specification relates to a method for quantifying an amine compound foiling a membrane active layer before preparing the membrane active layer, a method for quantifying polyamide or an unreacted amine compound in a membrane active layer, and method for determining setting criteria for a manufacturing condition of a membrane active layer or a method for setting a manufacturing condition.

BACKGROUND

A polyamide layer is used as an active layer of a membrane. For example, a reverse osmosis (RO) layer, an active layer determining performance of a reverse osmosis membrane, is formed through an interfacial polymerization reaction between two types of monomers consecutively coated on an ultrafiltration (UF) layer, a support layer. The reverse osmosis layer is formed differently depending on how much the first coated monomer is present on the ultrafiltration layer surface, a reaction area of the interfacial polymerization, and this determines performance of a reverse osmosis membrane.

Currently, the amount of a monomer participating in reverse osmosis layer formation is estimated by measuring a difference in the total weight of a sample before and after coating the monomer, however, this cannot be a measurement method to predict reverse osmosis layer formation since the amount of the monomer present on an ultrafiltration layer surface, a reaction area of the interfacial polymerization, may not be identified.

BRIEF DESCRIPTION

Technical Problem

In order to resolve problems described above, an analysis method to find out a monomer content and dispersion information on a surface of a support, a reaction area for forming an active layer of a membrane.

In view of the above, the present disclosure is directed to providing a method for quantifying an amine compound forming a membrane active layer before preparing the membrane active layer, a method for quantifying polyamide or an unreacted amine compound in a membrane active layer, and a method for determining setting criteria for a manufacturing condition of a membrane active layer or a method for setting a manufacturing condition.

Technical Solution

One embodiment of the present disclosure provides a method for quantifying an amine compound forming a membrane active layer before forming the membrane active layer, the method including coating a composition including an amine compound on a support; and analyzing distribution of the amine compound by depth from the coated surface on the support using an energy dispersive spectrometer (EDS) method.

Another embodiment of the present disclosure provides a method for quantifying polyamide or an unreacted amine compound in a membrane active layer.

The method includes coating a composition including an amine compound on a support;

preparing a membrane active layer by interfacially polymerizing polyamide through coating a composition including an acyl halide compound on the surface of the support on which the composition including an amine compound is coated; and analyzing distribution of the polyamide or the unreacted amine compound by depth from the surface on the support on which the polyamide is interfacially polymerized using an energy dispersive spectrometer (EDS) method.

Another embodiment of the present disclosure provides a method for determining setting criteria for a manufacturing condition of a membrane active layer.

The method includes a) coating a composition including an amine compound on a support using the method of the embodiment described above and then quantifying distribution of the amine compound by depth;

b) preparing a membrane active layer by interfacially polymerizing polyamide through coating a composition including an acyl halide compound on the surface of the support on which the composition including an amine compound is coated;

c) deriving a first evaluation result by evaluating performance of the prepared membrane active layer;

d) deriving a second or higher evaluation result by repeating a) to d) one or more times except that at least a part of the condition in the coating of a composition including an amine compound on a support in a) is adjusted to be different from the above-described a); and e) determining distribution of the amine compound by depth from the coated surface on the support in order to prepare a membrane active layer with better performance by comparing the first evaluation result and the second or higher evaluation result.

Another embodiment of the present disclosure provides a method for determining setting criteria for a manufacturing condition of a membrane active layer, the method including f) preparing a membrane active layer using the method of the embodiment described above and then quantifying distribution of polyamide or an unreacted amine compound in the membrane active layer by depth;

g) deriving a first evaluation result by evaluating performance of the membrane active layer prepared in f);

h) deriving a second or higher evaluation result by repeating f) to h) one or more times after adjusting at least a part of the condition in the preparing of a membrane active layer in f) to be different from the above-described f); and i) determining distribution of the polyamide or the unreacted amine compound in the membrane active layer by depth from the surface on the support on which the polyamide is interfacially polymerized in order to prepare a membrane active layer with better performance by comparing the first evaluation result and the second or higher evaluation result.

Another embodiment of the present disclosure provides a method for setting a manufacturing condition of a membrane active layer, the method including j) coating a composition including an amine compound on a support;

k) analyzing distribution of the amine compound by depth from the coated surface on the support using an energy dispersive spectrometer (EDS) method; and l) determining a manufacturing condition of the membrane active layer as the condition of j) when the value analyzed in k) is in the range of setting criteria of the membrane active layer determined in advance, or, when the value analyzed in k) is outside the range of the criteria determined in advance, conducting j) to l) again after changing at least a part of the condition of j).

Another embodiment of the present disclosure provides a method for setting a manufacturing condition of a membrane active layer.

The method includes m) coating a composition including an amine compound on a support and then preparing a membrane active layer by interfacial polymerizing polyamide through coating a composition including an acyl halide compound on the surface of the support on which the composition including an amine compound is coated;

n) analyzing distribution of the polyamide or the unreacted amine compound by depth from the surface on the support on which the polyamide is interfacially polymerized using an energy dispersive spectrometer (EDS) method; and o) determining a manufacturing condition of the membrane active layer as the condition of m) when the value analyzed in n) is in the range of setting criteria of the membrane active layer determined in advance, or, when the value analyzed in n) is outside the range of the criteria determined in advance, conducting m) to o) again after changing at least a part of the condition of m).

Provided is a method for setting a manufacturing condition of a separation membrane active layer including the same.

According to another embodiment of the present disclosure, the EDS method of the above-described embodiments uses a plurality of line scans.

Advantageous Effects

According to embodiments of the present disclosure, an analysis condition capable of specifying and detecting nitrogen, a constituent element of an amine compound for forming an active layer of a membrane, is established through an EDS component analysis method, and information on the amine compound dispersion can be obtained through trancing the nitrogen element. In addition, limitation of difficulty in obtaining a line profile of a lightweight element due to a low S/N (ratio of second signal with respect to nitrogen element) can be improved through a plurality of line scan methods obtaining an average value of a plurality of line profiles, that is, a multi-line method. Accordingly, by securing a clear distribution profile of the nitrogen atom in a depth direction from a support layer surface, information on dispersion can also be obtained as well as information on the amount of the amine compound in the support. As a result, a measurement method capable of finding out the amount of an amine compound that can form an active layer of a membrane by actually participating in a reaction on a support surface through an EDS component analysis using a plurality of line scans is developed.

In addition, even after forming polyamide through amine compound polymerization, the amount of the polyamide or distribution of the unreacted amine compound by depth can be quantified.

As described above, by quantifying distribution of an amine compound in a coating layer, or polyamide or an unreacted amine compound in an active layer by depth during a membrane active layer manufacturing process, performance of a final membrane can be predicted, and using the method is advantageous in setting materials or process conditions used in the membrane active layer manufacturing process.

DESCRIPTION OF DRAWINGS

FIG. 2A to FIG. 5B show distribution of an amine compound or polyamide measured in Examples 1 to 4.

DETAILED DESCRIPTION

Hereinafter, the present specification will be described in more detail.

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

In the present specification, a membrane includes an active layer including polyamide unless mentioned otherwise, and can be a water treatment or gas membrane. According to one embodiment, a membrane of the present specification is a reverse osmosis membrane.

A first embodiment of the present disclosure relates to a method for quantifying an amine compound forming a membrane active layer before forming the membrane active layer.

The method includes coating a composition including an amine compound on a support; and analyzing distribution of the amine compound by depth from the coated surface on the support using an energy dispersive spectrometer (EDS) method.

An EDS method refers to a method of, by irradiating a high energy electron beam on a specimen to have the beam reacting with the specimen, analyzing components of the specimen using a specific X-ray among various signals having structure and chemical composition information of the specimen.

The EDS method includes preparing a cross-section using microtoming for a specimen subject to analysis and coating a conductive material for providing conductivity.

The conductive material is not particularly limited, but can use Pt coating. In the steps, technologies known in the art can be used within the scope for conducting the EDS method.

In the EDS method, an acceleration voltage can be set at 5 Kv, and a current can be set within a range of 68 µA to 77 µA.

In the embodiment, by analyzing the amount of the amine compound using the EDS method, the nitrogen element that can quantify the amount of the amine compound can be analyzed. Particularly, the EDS method can analyze distribution of the amine compound by depth from the coated surface on the support rather than the total amount of the amine compound present on the support. Therefore, of the amine compound, only the amount participating in the actual polymerization and forming an active layer of a membrane can be analyzed.

According to one embodiment of the present disclosure, the EDS method can preferably use a plurality of line scans. When conducting the EDS method, a clearer nitrogen element profile can be obtained by using an average value of a plurality of line scans rather than using several points or one line and thereby reducing a peak noise in the EDN line scan.

According to a preferred embodiment, each line of the plurality of line scans can have 400 points or more, more preferably 450 points or more and even more preferably 500 points or more. As the number of points included in each line increases, accuracy that identifies distribution of the amine compound by depth increases, and in the above-mentioned range, scan results useful for setting a manufacturing condition of a membrane active layer can be obtained.

According to one preferred embodiment, the EDS method can scan 5 times or more, preferably 7 times or more, and even more preferably 10 times or more using 10 lines or more, preferably 15 lines or more and even more preferably 20 lines or more. As described above, accuracy that identifies distribution of the amine compound by depth increases as the number of lines increases, and in the above-mentioned range, scan results useful for setting a manufacturing condition of a membrane active layer can be obtained. The depth of the scan can be set as a region of interest by those skilled in the art.

A second embodiment of the present disclosure provides a method for quantifying polyamide or an unreacted amine compound in a membrane active layer.

The method including coating a composition including an amine compound on a support;

preparing a membrane active layer by interfacial polymerizing polyamide through coating a composition including an acyl halide compound on the surface of the support on which the composition including an amine compound is coated; and analyzing distribution of the polyamide or the unreacted amine compound by depth from the surface on the support on which the polyamide is interfacially polymerized using an energy dispersive spectrometer (EDS) method.

Whereas the first embodiment quantifies an amine compound forming a membrane active layer before forming the membrane active layer, the second embodiment relates to a method for quantifying polyamide or an unreacted amine compound in a membrane active layer after forming the membrane active layer. By quantifying polyamide or an unreacted amine compound in a membrane active layer as above, effects of a process condition after the coating of the composition including an amine compound on the amount of the polyamide or the unreacted amine compound can be identified. Using the second embodiment, effects of a condition for the coating of the composition including an amine compound on the amount of the polyamide or the unreacted amine compound can also be identified. The condition of the EDS method is the same as the descriptions provided above relating to the first embodiment.

Further embodiments of the present disclosure provide a method for determining setting criteria for a manufacturing condition of a membrane active layer using the method for quantifying an amine compound or the method for quantifying polyamide or an unreacted amine compound in a membrane active layer described above.

A third embodiment of the present disclosure provides a method for determining setting criteria for a manufacturing condition of a membrane active layer, the method including
 a) coating a composition including an amine compound on a support using the method of the first embodiment described above and then quantifying distribution of the amine compound by depth;
 b) preparing a membrane active layer by interfacial polymerizing polyamide through coating a composition including an acyl halide compound on the surface of the support on which the composition including an amine compound is coated;
 c) deriving a first evaluation result by evaluating performance of the prepared membrane active layer;
 d) deriving a second or higher evaluation result by repeating a) to d) one or more times except that at least a part of the condition in the coating of a composition including an amine compound on a support in a) is adjusted to be different from the above-described a); and
 e) determining distribution of the amine compound by depth from the coated surface on the support in order to prepare a membrane active layer with better performance by comparing the first evaluation result and the second or higher evaluation result.

By determining distribution of the amine compound by depth from the coated surface on the support for preparing a membrane active layer with better performance as in the third embodiment, this can be setting criteria for a manufacturing condition of the membrane active layer. Using the setting criteria determined as above, performance of a finally prepared membrane active layer obtained by changing a manufacturing condition of the membrane active layer can be predicted, and therefore, a manufacturing condition of the membrane active layer can be readily set.

In the third embodiment, different conditions between a) and d) can include any of a material, a structure or a manufacturing process condition of each layer, and for example, can include at least one of a type of the support, a moisture content of the support, a solid content of the composition including an amine compound, a coating amount of the composition including an amine compound, a method for coating the composition including an amine compound, and presence of additives in the support or the composition including an amine compound.

A fourth embodiment of the present disclosure provides a method for determining setting criteria for a manufacturing condition of a membrane active layer, the method including f) preparing a membrane active layer using the method of the embodiment described above and then quantifying distribution of polyamide or an unreacted amine compound in the membrane active layer by depth;

g) deriving a first evaluation result by evaluating performance of the membrane active layer prepared in f);

h) deriving a second or higher evaluation result by repeating f) to h) one or more times after adjusting at least a part of the condition in the preparing of a membrane active layer in f) to be different from the above-described f); and i) determining distribution of the polyamide or the unreacted amine compound in the membrane active layer by depth from the surface on the support on which the polyamide is interfacially polymerized in order to prepare a membrane active layer with better performance by comparing the first evaluation result and the second or higher evaluation result.

Provided is a method for determining a setting criterion of a manufacturing condition of a separation membrane active layer including the same.

In the fourth embodiment as well, a manufacturing condition of the membrane active layer can be readily set by determining distribution of the polyamide or the unreacted amine compound in the membrane active layer by depth from the surface on the support on which the polyamide is interfacially polymerized as setting criteria for a manufacturing condition of the membrane active layer in order to prepare a membrane active layer with better performance.

In the fourth embodiment, different conditions between f) and h) can include any of a material, a structure or a manufacturing process condition of each layer, and for example, can include at least one of a type of the support; a moisture content of the support; a solid content of the composition including an amine compound; a coating amount of the composition including an amine compound; a method for coating the composition including an amine compound; a solid content of the composition including an acyl halide compound; a coating amount of the composition including an acyl halide compound; a method for coating the composition including an acyl halide compound; the interfacial polymerization condition; the condition of treatment after the interfacial polymerization; and presence of additives in the support, the composition including an amine compound or the composition including an acyl halide compound. Herein, the condition of treatment after the interfacial polymerization includes a drying condition, a post-treatment condition for the active layer after the interfacial polymerization, a washing condition, or a condition for forming an additional layer on the active layer after the interfacial polymerization.

Further embodiments of the present disclosure relate to a method for setting a manufacturing condition of a membrane active layer using the setting criteria for a manufacturing condition of a membrane active layer described above.

A fifth embodiment of the present disclosure provides a method for setting a manufacturing condition of a membrane active layer, the method including j) coating a composition including an amine compound on a support;

k) analyzing distribution of the amine compound by depth from the coated surface on the support using an energy dispersive spectrometer (EDS) method; and l) determining a manufacturing condition of the membrane active layer as the condition of j) when the value analyzed in k) is in the range of setting criteria of the membrane active layer determined in advance, or, when the value analyzed in k) is outside the range of the criteria determined in advance, conducting j) to l) again after changing at least a part of the condition of j).

The present invention relates to a method for setting a manufacturing condition of a separation membrane active layer.

Like the third embodiment described above, the fifth embodiment can be used when determining distribution of the amine compound by depth from the coated surface on the support as setting criteria for a manufacturing condition of a membrane active layer.

The manufacturing condition that can be determined according to the fifth embodiment is not particularly limited as long as it is a composition, a structure or a process condition of the material used up to the coating of a composition including an amine compound on a support, and for example, can include conditions illustrated as different conditions between a) and d) in the third embodiment described above. Herein, the condition for the EDS method is the same as the descriptions provided above relating to the first embodiment.

A sixth embodiment of the present disclosure provides a method for setting a manufacturing condition of a membrane active layer, the method including m) coating a composition including an amine compound on a support and then preparing a membrane active layer by interfacial polymerizing polyamide through coating a composition including an acyl halide compound on the surface of the support on which the composition including an amine compound is coated;

n) analyzing distribution of the polyamide or the unreacted amine compound by depth from the surface on the support on which the polyamide is interfacially polymerized using an energy dispersive spectrometer (EDS) method; and o) determining a manufacturing condition of the membrane active layer as the condition of m) when the value analyzed in n) is in the range of setting criteria of the membrane active layer determined in advance, or, when the value analyzed in n) is outside the range of the criteria determined in advance, conducting m) to o) again after changing at least a part of the condition of m).

Provided is a method for setting a manufacturing condition of a separation membrane active layer including the same.

Like the fourth embodiment described above, the sixth embodiment can be used when determining distribution of the polyamide or the unreacted amine compound in the membrane active layer by depth from the surface on the support on which the polyamide is interfacially polymerized as setting criteria for a manufacturing condition of the membrane active layer.

The manufacturing condition that can be determined according to the sixth embodiment is not particularly limited as long as it is a composition, a structure or a process condition of the material used up to the preparing of a membrane active layer, and for example, can include conditions illustrated as different conditions between f) and h) in the fourth embodiment described above. Herein, the condition for the EDS method is the same as the descriptions provided above relating to the first embodiment.

In the embodiments, the support can include a porous support and a polymer support layer.

In one embodiment of the present disclosure, materials used as a support of a membrane can be used without limit as the porous support. Examples thereof can include polyester, polypropylene, nylon, polyethylene or non-woven fabric, but are not limited thereto.

In one embodiment of the present disclosure, the porous support is non-woven fabric.

According to one embodiment of the present disclosure, the porous support can have a thickness of 100 μm to 200 μm, however, the thickness is not limited thereto, and can be adjusted as necessary. In addition, the porous support can preferably have a pore size of 500 nm to 10 μm, however, the pore size is not limited thereto.

The thickness of the porous support and the pore size of the porous support can be measured using a digital thickness gauge and a porometer, respectively.

In one embodiment of the present disclosure, the polymer support layer can be prepared by coating a hydrophilic polymer solution on the porous support.

The hydrophilic polymer solution can be prepared by dissolving a hydrophilic polymer in a solvent. As the hydrophilic polymer, polysulfone, polyethersulfone, polycarbonate, polyethylene oxide, polyimide, polyetherimide, polyetheretherketone, polypropylene, polymethylpentene, polymethyl chloride, polyvinylidene fluoride or the like can be used, however, the hydrophilic polymer is not limited thereto. Specifically, the hydrophilic polymer can be polysulfone.

The solvent can be used without limit as long as it is capable of dissolving a hydrophilic polymer. Examples thereof can include acetone, acetonitrile, tetrahydrofuran (THF), dimethyl sulfoxide (DMSO), dimethylformamide (DMF), hexamethylphosphoamide (HMPA) and the like, but are not limited thereto. The hydrophilic polymer can be included in 10% by weight to 30% by weight based on a total weight of the hydrophilic polymer solution.

The coating method can use dipping, spray, coating or the like, but is not limited thereto.

The polymer support layer can have a thickness of 30 μm to 60 μm. The thickness of the support layer can be measured using a screen observed by a scanning electron microscope (SEM).

In embodiments of the present disclosure, the active layer includes polyamide. According to one embodiment, the active layer can be prepared by interfacial polymerizing a composition including an amine compound and a composition including an acyl halide compound. The composition including an amine compound can be an aqueous solution, and the composition including an acyl halide compound can be an organic solution.

In one embodiment of the present disclosure, the amine compound can be an aromatic amine compound.

In one embodiment of the present disclosure, the active layer can be prepared by interfacial polymerizing an aqueous solution including a compound of the following Chemical Formula 1 and an organic solution including an acyl halide compound:

Chemical Formula 1

In Chemical Formula 1, n is an integer of 0 or 1, and m is an integer of 1 or 2.

In one embodiment of the present disclosure, the amine compound can include the compound of Chemical Formula 1. For example, m-phenylenediamine, p-phenylenediamine, 2,3-diaminotoluene, 2,4-diaminotoluene, 2,5-diaminotoluene, 2,6-diaminotoluene, 3,4-diaminotoluene, m-toluidine, p-toluidine, o-toluidine or the like can be used, however, the amine compound is not limited thereto.

In one embodiment of the present disclosure, a content of the amine compound can be greater than or equal to 0.1% by weight and less than or equal to 20% by weight, preferably from 0.5% by weight to 15% by weight, and more preferably from 1% by weight to 10% by weight based on a total weight of the aqueous solution including an amine compound. A more uniform polyamide active layer can be prepared when the amine compound content is in the above-mentioned range.

In one embodiment of the present disclosure, the aqueous solution including an amine compound can further include a surfactant.

When interfacially polymerizing the polyamide active layer, the polyamide is quickly prepared at an interface of the aqueous solution layer including an amine compound and the organic solution layer including an acyl halide compound, and herein, the surfactant makes the layer thin and uniform so that the amine compound present in the aqueous solution layer including an amine compound readily migrates to the organic solution layer including an acyl halide compound to prepare a uniform polyamide active layer.

In one embodiment of the present disclosure, the surfactant can be selected from among nonionic, cationic, anionic and amphoteric surfactants.

According to one embodiment of the present disclosure, the surfactant can be selected from among sodium lauryl sulphate (SLS), alkyl ether sulphates, alkyl sulphates alkyl sulphates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide), alkyl polyglucosides such as octyl glucoside or decyl maltoside, aliphatic acid alcohols and alkyl betaines such as cetyl alcohol or oleyl alcohol, cocamide MEA, cocamide DEA, alkyl hydroxyethyldimethylammonium chloride, cetyltrimethyl-ammonium bromide or chloride, hexadecyltrimethylammonium bromide or chloride. Specifically, the surfactant can be SLS, octylphenol ethoxylates or ethoxylated nonylphenols.

Particularly, when using sodium lauryl sulphate (SLS) as the surfactant, the sodium lauryl sulphate (SLS) is highly soluble in water due to its high hydrophile-lipophile balance (HLB), and by having a high critical micelle concentration (CMC), preparation of the polyamide active layer is not inhibited even when added in excess.

In one embodiment of the present disclosure, the surfactant can be added in 0.005% by weight to 0.5% by weight based on a total weight of the aqueous solution including an amine compound.

In one embodiment of the present disclosure, a solvent of the aqueous solution including an amine compound can be water, and in the aqueous solution including an amine compound, the remainder excluding the amine compound and the surfactant can be water.

In one embodiment of the present disclosure, the aqueous solution including an amine compound can be prepared as an aqueous solution layer comprising the amine compound on the support.

In one embodiment of the present disclosure, a method for preparing the aqueous solution layer including an amine compound on the support layer is not particularly limited, and methods capable of preparing the aqueous solution layer including an amine compound on the support layer can be used without limit. Specifically, spraying, coating, dipping, dropping or the like can be used.

In one embodiment of the present disclosure, the aqueous solution layer including an amine compound can additionally perform a step of removing an aqueous solution including an excess amine compound as necessary.

The aqueous solution layer including an amine compound prepared on the support layer can be non-uniformly distributed when there is too much of the aqueous solution including an amine compound present on the support layer, and when the aqueous solution including an amine compound is non-uniformly distributed, a non-uniform polyamide active layer may be prepared by subsequent interfacial polymerization.

Accordingly, the aqueous solution including an excess amine compound is preferably removed after preparing the aqueous solution layer including an amine compound on the support layer. A method of removing the aqueous solution including an excess amine compound is not particularly limited, however, methods using a sponge, an air knife, nitrogen gas blowing, natural drying, a compression roll or the like can be used.

In the organic solution including an acyl halide compound in one embodiment of the present disclosure, the acyl halide compound is not particularly limited as long as it is capable of being used in polyamide polymerization, but can be an aromatic compound having 2 or 3 carboxylic acid halides.

For example, one type, or a mixture of two or more types selected from the group consisting of trimesoyl chloride, isophthaloyl chloride and terephthaloyl chloride can be used as the acyl halide compound, and preferably, trimesoyl chloride can be used.

In one embodiment of the present disclosure, an organic solvent included in the organic solution including an acyl halide compound preferably does not participate in an interfacial polymerization reaction, and an aliphatic hydrocarbon solvent, for example, one or more types selected from among freons, alkane having 5 to 12 carbon atoms, isoparaffin-based solvents, and an alkane mixture material, can be included.

Specifically, hexane, heptane, octane, nonane, decane, undecane, dodecane, cyclohexane, IsoPar (Exxon), IsoPar G (Exxon), ISOL-C(SK Chem), ISOL-G (Exxon) or the like can be used, however, the organic solvent is not limited thereto.

In one embodiment of the present disclosure, a content of the acyl halide compound can be from 0.05% by weight to 1% by weight, preferably from 0.05% by weight to 0.75% by weight, and more preferably from 0.05% by weight to 0.5% by weight based on a total weight of the organic solution including an acyl halide compound. A more uniform polyamide layer can be prepared when the acyl halide compound content is in the above-mentioned range.

In one embodiment of the present disclosure, the organic solution including an acyl halide compound can be prepared as a layer of the organic solution comprising an acyl halide compound.

In one embodiment of the present disclosure, a method of preparing the organic solution layer including an acyl halide compound on the aqueous solution layer including an amine compound prepared on the support is not particularly limited, and methods capable of preparing the organic solution layer on the support layer can be used without limit. Specifically, spraying, coating, dipping, dropping or the like can be used.

In one embodiment of the present disclosure, in the organic solution including an acyl halide compound, the remainder excluding the acyl halide compound can be an organic solvent.

In one embodiment of the present disclosure, the active layer can have a thickness of 100 nm to 500 nm. The active layer thickness can vary depending on the concentration of the composition for preparing an active layer including the aqueous solution including an amine compound and the organic solution including an acyl halide compound used for preparing the active layer, and the coating condition.

The active layer thickness can be measured using a screen observed by a scanning electron microscope (SEM). Specifically, a cross section of a 0.2 cm sample is cut using a microtome, platinum (Pt) is coated thereon, and an average value is calculated by measuring thicknesses of the active layer using a scanning electron microscope (SEM).

According to one embodiment of the present disclosure, the membrane active layer can be post-treated, or a protective layer can be formed thereon.

In one embodiment of the present disclosure, the membrane can be a flat sheet. Membranes can have shapes such as flat-sheet, spiral-wound, tube-in-shell or hollow-fiber, however, in one embodiment of the present disclosure, the membrane can be a flat sheet. In another embodiment, the membrane can have a spiral-wound shape.

Hereinafter, the present specification will be described in detail with reference to examples. However, the examples according to the present specification can be modified to various other forms, and the scope of the present disclosure is not to be construed as being limited to the examples described below. Examples of the present disclosure are provided in order to more fully describe the present specification to those having average knowledge in the art.

EXAMPLES

Reference Example

A polysulfone solid was introduced to an N,N-dimethylformamide (DMF) solution, and dissolved therein for 12 hours or longer at 80° C. to 85° C. to obtain a uniform solution. In the solution, a content of the polysulfone solid was 18% by weight.

This solution was cast to a thickness of 150 μm on a non-woven fabric (porous support) made of a polyester material and having a thickness of 95 μm to 100 μm to prepare a support layer. Then, the cast non-woven fabric was placed in water to prepare a porous polysulfone support layer.

In order to prepare an active layer on the support layer, an aqueous solution including 8% by weight of m-phenylenediamine (mPD), 0.5% by weight of sodium lauryl sulphate (SLS) as a surfactant, and 91.5% by weight of water with respect to a total weight of the aqueous solution including an amine compound was coated to prepare an aqueous solution layer including an amine compound.

After that, an organic solution including an acyl halide compound including 0.3% by weight of trimesoyl chloride (TMC) and 99.7% by weight of hexane based on a total weight of the organic solution including an acyl halide compound was coated on the aqueous solution layer to prepare an organic solution layer, and by conducting interfacial polymerization, an active layer including polyamide was prepared to a thickness of 250 nm.

Example 1

In the reference example, after preparing the aqueous solution layer including an amine compound and before coating the organic solution including an acyl halide compound, the element was analyzed using an EDS (Extreme Oxford) method under a condition of the number of lines of 20, the number of points per line of 500 and the number of scans of 20 times. In the EDS method, an acceleration voltage was 5 Kv, and a current was from 68 µA to 77 µA. For the EDS analysis, a cross section was prepared using microtoming and Pt coating was conducted.

Figure 1:
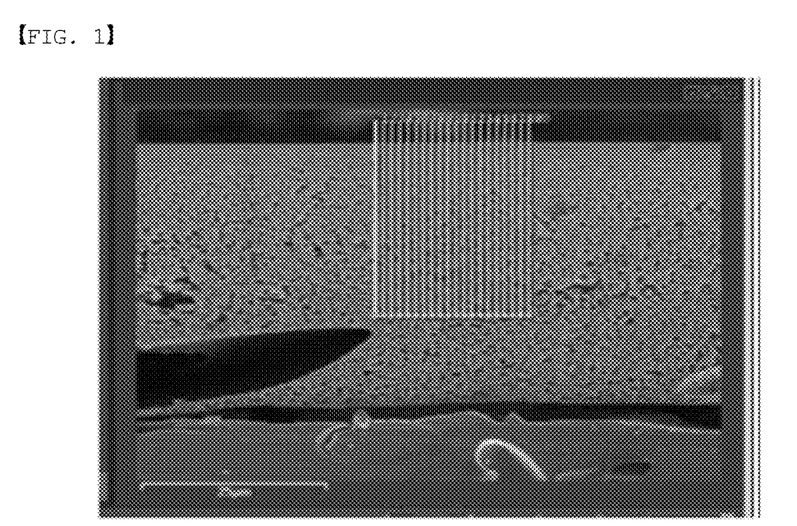
FIG. 1 is an image of scanning using an EDS method according to a method of Example 1.

FIG. 1 is an image of scanning using the EDS method according to the method of Example 1, and is a SEM (JSM-7200F JEOL) image (magnitude 1,500 times) of an object subject to evaluation.

Figure 2:
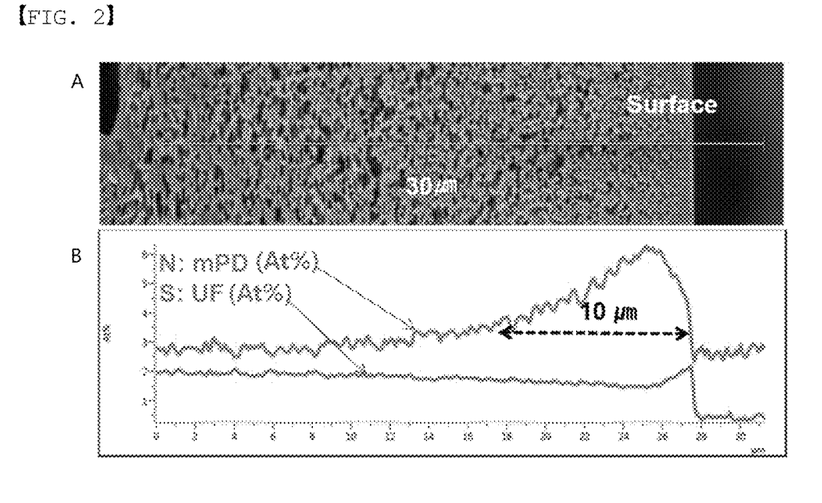

FIG. 2A shows a SEM image (magnitude 1,500 times) and FIG. 2B shows an EDS analysis result showing distribution of mPD, the amine compound, on the porous polysulfone support layer.

As shown in FIG. 2B, it was identified that, after coating the aqueous solution layer including an amine compound, mPD distributed in a range of 10 µm depth from the support surface so as to participate in the interfacial polymerization reaction, and it was seen that this mPD can form polyamide during the interfacial polymerization.

Comparative Example

Figure 3:
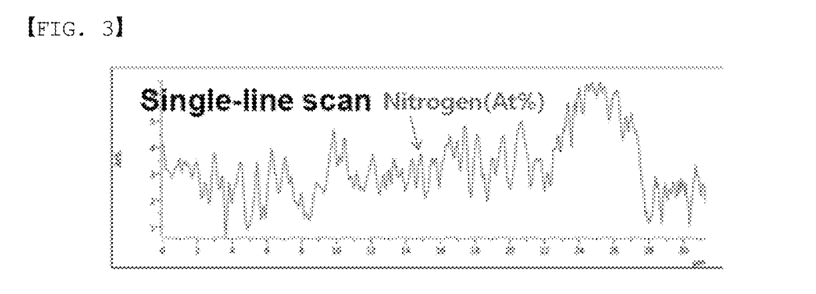

An experiment was conducted in the same manner as in Example 1 except that a single-line scan was conducted.
An EDS analysis result is shown in FIG. 3.

Examples 2 and 3

Figure 4:
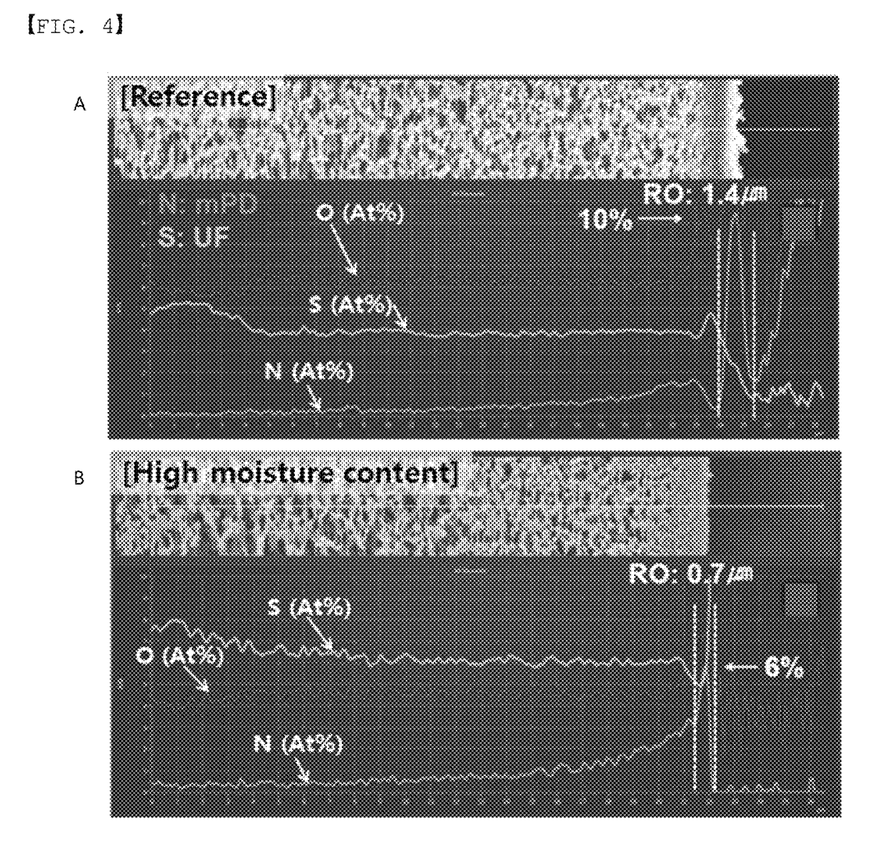

After forming the active layer in the reference example, the content of the polyamide and the unreacted amine compound was measured using an EDS method. However, the moisture content, measured after preparing the porous polysulfone support layer, was adjusted to 30% in Example 2, and the moisture content, measured after preparing the porous polysulfone support layer, was adjusted to 35% in Example 3. The condition for the EDS was the same as in Example 1. The measurement result of Example 2 is shown in FIG. 4A, and the measurement result of Example 3 is shown in FIG. 4B (SEM image magnitude 1,500 times). The part expressed as RO in FIGS. 4A and 4B indicates a polyamide layer, the active layer, and it was identified that the active layer thickness and the polyamide content were different depending on the moisture content of the support after forming the porous polysulfone support layer. In this manner, performance of the membrane can be measured depending on the polyamide content measured using the EDS method.

Examples 4 and 5

After forming the active layer in the reference example, the content of each of the polyamide and the unreacted amine compound was measured using an EDS method. Herein, in Example 4 and Example 5, the time of the drying process before conducting the EDS method was varied, and in Example 5, the time of the drying process was relatively long compared to Example 4. The condition for the EDS was the same as in Example 1. The measurement results of Example 4 are shown in FIG. 5A, and the measurement results of Example 5 are shown at FIG. 5B (SEM image magnitude 20,000 times).

Figure 5:
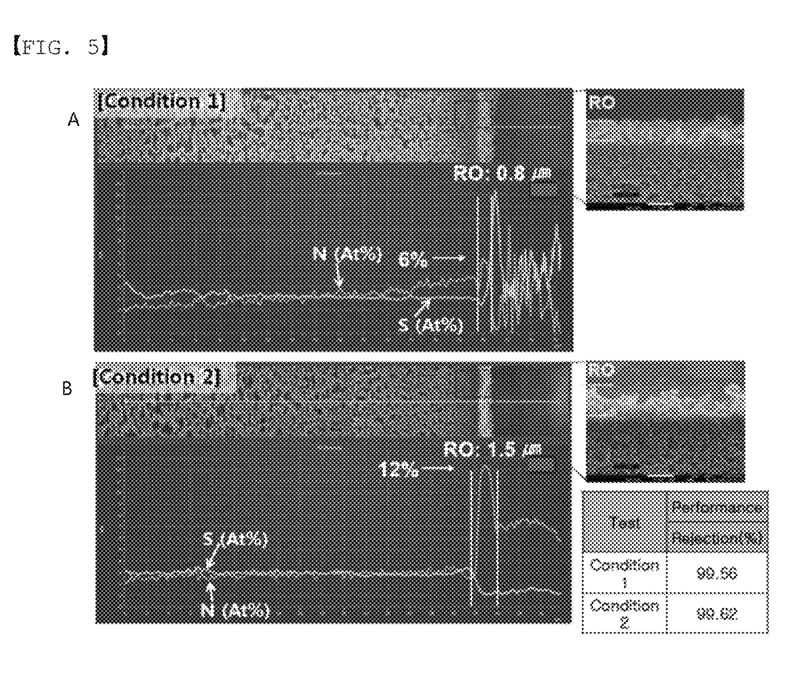

As for salt rejection of the membrane in FIG. 5B, a general method of measuring salt rejection of a reverse osmosis membrane was used. In other words, it is a result of calculating how much salt is removed from an aqueous NaCl solution as a value.

Figure 6:
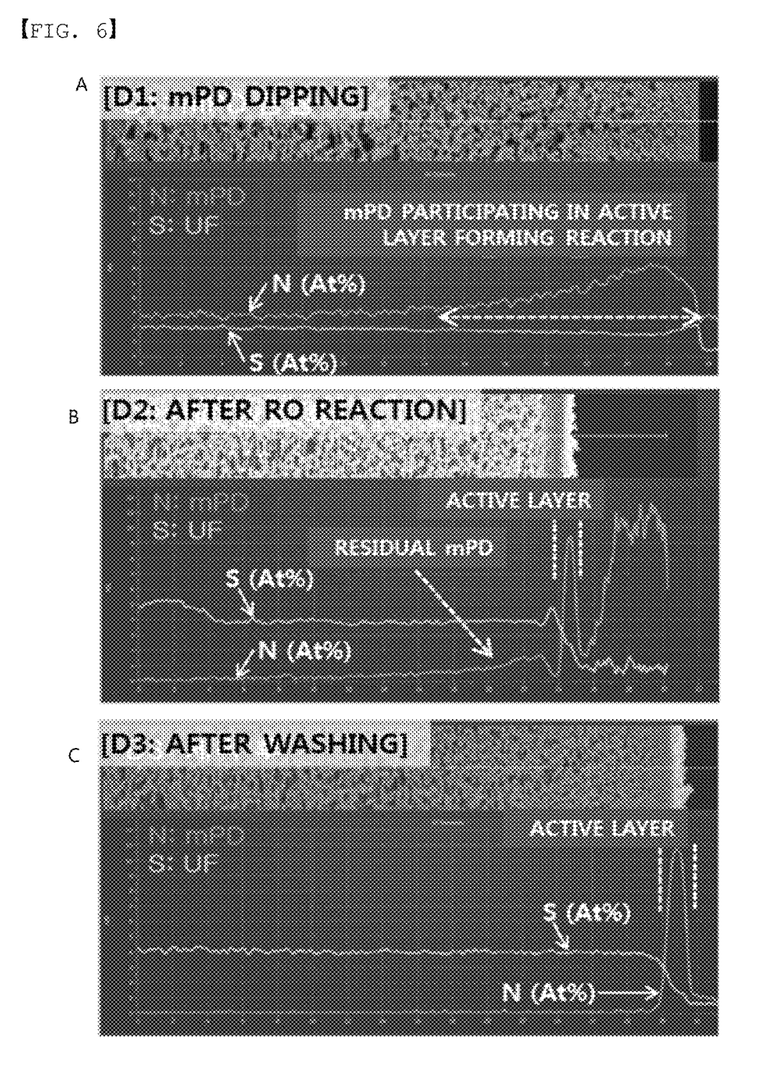
FIGS. 6A-6C show distribution of an unreacted amine compound of a nitrogen-containing compound depending on a process step.

In addition, it was identified that the unreacted amine compound was removed by washing. FIGS. 6A-6C show changes in the peak after preparing the aqueous solution layer including an amine compound (D1, FIG. 6A), after forming the active layer by interfacial polymerization (D2, FIG. 6B), and after washing (D3, FIG. 6C). Accordingly, the peak of the unreacted amine compound can be distinguished in the EDS analysis result, and by predicting membrane performance using the amount and distribution by depth of the unreacted amine compound, a manufacturing condition of the membrane can be readily set.

The invention claimed is:

1. A method for determining setting criteria for a manufacturing condition of a membrane active layer for a reverse osmosis layer, the method comprising:
   a) coating a composition including an amine compound on a surface of a support to form a coated support surface and then quantifying a distribution of the amine compound by depth from an outermost surface on the coated support surface using an energy dispersive spectrometer (EDS) method by irradiating with an electron beam having sufficient energy to generate X-rays and determining a distribution profile of a nitrogen constituent of the amine compound in a depth direction from the outermost surface on the coated support surface to quantify an amount of the amine compound that can form a membrane active layer of a membrane by participating in a reaction on the coated surface of the support,
   wherein:
      in the EDS method, a combination of an acceleration voltage of 5 kV and a current within a range of 68 µA to 77 µA is used, and
      the distribution profile is determined prior to coating a composition including an acyl halide compound on the coated surface including the amine compound to perform an interfacial polymerization to form a polyamide layer, and
      the EDS method uses line scans of 10 lines or more, and scans 5 times or more for each line;
   b) preparing a membrane active layer by interfacially polymerizing polyamide by coating a composition including an acyl halide compound on the surface of the support on which the composition including an amine compound is coated;
   c) deriving a first evaluation result by evaluating performance of the prepared membrane active layer;
   d) deriving a second or higher evaluation result by repeating a) and b) and evaluating performance of the prepared membrane active layer one or more times except that at least a part of the condition in the coating of the composition including an amine compound on a support in a) is adjusted to be a different condition from the above-described a); and e) comparing the first evaluation result and the second or higher evaluation result to determine a distribution of the amine compound by depth from the coated surface on the support in order to set materials or process conditions to be used in the membrane active layer manufacturing process.

2. The method of claim 1, wherein each line of the plurality of line scans has 400 analysis points or more.

3. The method of claim 1, wherein the different condition is at least one of a type of the support, a moisture content of the support, a solid content of the composition including an amine compound, a coating amount of the composition including an amine compound, a method for coating the composition including an amine compound, and presence of additives in the support or the composition including an amine compound.

4. The method of claim 1, further comprising:

f) preparing a membrane active layer by manufacturing the membrane active layer for a reverse osmosis layer of a reverse osmosis membrane according to the set materials or process conditions.

\* \* \* \* \*